United States Patent
Murakami

(10) Patent No.: US 7,305,854 B2
(45) Date of Patent: Dec. 11, 2007

(54) METHODS FOR PRODUCING SUBSTRATE BLANK

(75) Inventor: Akira Murakami, Tokyo (JP)

(73) Assignee: Hoya Corporation, Tokyo (JP)

( * ) Notice: Subject to any disclaimer, the term of this patent is extended or adjusted under 35 U.S.C. 154(b) by 0 days.

(21) Appl. No.: 10/058,236

(22) Filed: Jan. 29, 2002

(65) Prior Publication Data

US 2002/0139145 A1 Oct. 3, 2002

(30) Foreign Application Priority Data

Jan. 29, 2001 (JP) .............................. 2001-020379

(51) Int. Cl.
C03B 23/00 (2006.01)
B32B 5/00 (2006.01)
(52) U.S. Cl. .............................. 65/102; 65/105; 65/112
(58) Field of Classification Search ................. 65/102, 65/305, 317, 318, 111, 112, 105
See application file for complete search history.

(56) References Cited

U.S. PATENT DOCUMENTS

| | | | |
|---|---|---|---|
| 4,591,373 A * | 5/1986 | Sato ........................... | 65/29.19 |
| 4,836,840 A * | 6/1989 | Hirota et al. ................. | 65/323 |
| 5,938,807 A * | 8/1999 | Komiyama et al. ......... | 65/29.12 |
| 6,339,197 B1 * | 1/2002 | Fushie et al. ................ | 174/262 |
| 6,442,975 B1 * | 9/2002 | Murakami et al. ............ | 65/61 |
| 6,567,223 B2 * | 5/2003 | Ludington ................... | 359/811 |
| 2002/0184921 A1* | 12/2002 | Kawata et al. ................ | 65/102 |
| 2003/0134734 A1* | 7/2003 | Nishimoto et al. ........... | 501/69 |

FOREIGN PATENT DOCUMENTS

| | | | |
|---|---|---|---|
| JP | 63265833 A | * | 11/1988 |
| JP | 01-119536 | * | 5/1989 |
| JP | 01-176240 | * | 7/1989 |
| JP | 04-331725 | * | 11/1992 |
| JP | 04317427 A | * | 11/1992 |
| JP | 08040729 A | * | 2/1996 |
| JP | 10-194760 | | 7/1998 |
| JP | 10-212125 | * | 8/1998 |
| JP | 10-236831 | * | 9/1998 |
| JP | 2000-53431 | | 2/2000 |

OTHER PUBLICATIONS

Machine translation of JP 08-040729 retrived from http://www19.ipdl.ncipi.go.jp/PA1/cgi-bin/PA1INIT?1102431898753 on Aug. 15, 2006, 9 pages.*

* cited by examiner

Primary Examiner—Carlos Lopez
(74) Attorney, Agent, or Firm—Nixon & Vanderhye P.C.

(57) ABSTRACT

A method for producing a thin-plate-shaped substrate blank that is an intermediate for a glass substrate, in which the occurrence of undulation is prevented and the substrate blank is produced with high accuracy, the method comprising press-molding a glass in a softened state with a mold having an upper mold member and a lower mold member to produce the thin-plate-shaped substrate blank, wherein the glass in a softened state is press-molded without causing any surrounding edge portion of the substrate blank under the production to come into contact with the mold, to produce the substrate blank at least having no notch portion.

13 Claims, 2 Drawing Sheets

(a)

(b)

METHODS FOR PRODUCING SUBSTRATE BLANK

FIELD OF THE INVENTION

The present invention relates to methods for producing a substrate blank, a substrate and an information recording medium. More specifically, it relates to a method for the production of a substrate blank as an intermediate for a substrate such as a substrate for an information recording medium by press-molding a molten glass according to direct press-molding, in which the occurrence of undulation is prevented and the substrate blank is produced with high accuracy, a method for the production of a substrate, in which the above substrate blank is cut and polished, and a method for the production of an information recording medium from the above substrate.

PRIOR ART

As a substrate for a hard disk drive for use as a large-capacity storage means for a personal computer, etc., a substrate made of glass or glass ceramic is widely used as one having high performances and high reliability. With increasing uses of personal computers and developments of information network society, demands for substrates made of glass or glass ceramic for information recording media and information recording media are rapidly increasing in recent years. For complying with such demands, it is desired to develop substrate production techniques that attain high productivity. Of such techniques, the most efficient method includes a so-called direct press method in which a molten glass is press-molded in a mold to produce an intermediate made of glass having a form so close to the form of a substrate as to include a cutting and polishing margin or a volume change that takes place during crystallization.

As a method for producing an intermediate for a substrate for an information recording medium by direct press, there is known a method disclosed in JP-A-12-53431. In this method, a groove called a notch is made in a portion where an internal hole is to be made, at the stage of forming an intermediate for facilitating the processing of the internal hole in a hard disk substrate. And, there is employed a constitution in which even if the amount of a molten glass supplied is too large, a surrounding edge portion of the intermediate is not defined with a sleeve member of a mold so that an excess volume of the glass is freed toward the surrounding edge portion, whereby intermediates having a stable thickness each can be obtained even if the volume of the glass to be supplied each time varies.

In addition to the above intermediate described in the above Publication, there is also known a disk-shaped intermediate having no notch made therein as an orthodox intermediate. In this case, the surrounding edge portion is defined by a mold.

Meanwhile, it is essential to cut and polish the intermediate formed by the direct press method, for producing a substrate, so that cutting and polishing dust called sludge occurs. It is strongly demanded to decrease the sludge in amount for saving resources, decreasing a waste material to decrease a burden on environments and decreasing a cost. The direct press method is therefore required to produce intermediates having a thickness each close to the thickness of a substrate in the direct press method.

SUMMARY OF THE INVENTION

Under the circumstances, it is an object of the present invention to provide a method for efficiently producing a substrate blank having the form of a thin plate as an intermediate for a substrate by a direct press method, in which the occurrence of undulation is prevented and the substrate blank is produced with high accuracy.

It is another object of the present invention to provide a glass substrate or a crystallized glass substrate for an information recording medium from the above substrate blank.

It is further another object of the present invention to provide a method for producing an information recording medium from the above substrate.

For achieving the above objects, the present inventor has made diligent studies and has found the following. In the production of a substrate blank by a direct press method, the cooling step after the press molding involves a phenomenon that an intermediate is caused to have an undulation having a microscopic valley and hill having a level difference of 100 µm or greater, which undulation is like an undulation of potato chips. When a large cutting and polishing margin can be secured, the above undulation can be modified after the press molding so as to attain the form of a good product. However, with a decrease in the cutting and polishing margin, the modification comes to be no longer possible by post-processing, and with a decrease in the thickness of the intermediate, the above undulation tends to appear to a greater extent. It has been found that the above undulation can be decreased by decreasing the heat radiation distribution in the surface of the intermediate having the form of a thin plate. That is, when a notch described in the above Publication is made, the heat that is absorbed into a mold increases in a portion where the notch is made. Since the notch is not so provided as to occupy a large area, the intermediate is caused to have a portion where the amount of heat radiation is locally large. This is also true of the case where a notch is made in a portion near the surrounding edge portion of an intermediate, and the amount of heat radiation is larger. In the method of defining the surrounding edge portion of an intermediate with a mold, which is a conventional orthodox method, heat is conducted from the surrounding edge portion to the mold, so that the circumferential area is liable to have a lower temperature than the central area. The distribution of heat radiation from the press-molded article (distribution in a surface perpendicular to the pressing direction) comes to be greater, and a portion in the vicinity of the surrounding edge portion of the intermediate formed is undulated.

The present inventor has made further studies on the basis of the above findings and as a result has found that when a glass in a softened state is press-molded such that no circumferential portion of a substrate blank to be formed comes in contact with a mold, and when the substrate blank has no notch portion, there can be efficiently produced a substrate blank that is free of an undulation and has excellent accuracy.

Further, it has been found that a glass substrate such as a substrate for an information recording medium can be easily obtained by cutting and polishing the thus-obtained substrate blank and that a desired information recording medium can be obtained by forming an information recording layer on the above substrate.

The present invention has been completed on the basis of the above findings.

That is, the present invention provides:

(1) a method for producing a substrate blank that is an intermediate for a substrate, which comprises press-molding a glass in a softened state with a mold having an upper mold member and a lower mold member to produce the substrate blank having the form of a thin plate, wherein the glass in a softened state is press-molded without causing any surrounding edge portion of the blank under the production to come into contact with the mold, to produce the substrate blank at least having no notch portion, (2) a method for producing a substrate blank that is an intermediate for a substrate, which comprises press-molding a glass in a softened state with a mold having an upper mold member and a lower mold member to produce the substrate blank having the form of a thin plate, wherein the glass in a softened state is press-molded without causing any surrounding edge portion of the blank under the production to come into contact with the mold, to produce the substrate blank having flat front and reverse surfaces and a surface formed of the surrounding edge portion, (3) a method for producing a substrate blank that is an intermediate for a substrate, which comprises press-molding a glass in a softened state with a mold having an upper mold member and a lower mold member to produce the substrate blank having the form of a thin plate, wherein the glass in a softened state is press-molded without causing any surrounding edge portion of the blank under the production to come into contact with the mold, to produce the substrate blank having a thickness whose minimum value is greater than the maximum value of thickness of a glass substrate to be obtained from said substrate blank, (4) a method for producing a substrate blank that is an intermediate for a substrate, which comprises press-molding a glass in a softened state with a mold having an upper mold member and a lower mold member to produce the substrate blank having the form of a thin plate, wherein the glass in a softened state is press-molded without causing any surrounding edge portion of the blank under the production to come into contact with the mold, to produce the substrate blank having a large-thickness portion and a small-thickness portion whose thickness is the smallest, the small-thickness portion having a larger area than the large-thickness portion, (5) a method for producing a substrate, which comprises cutting and polishing the substrate blank produced by any one of the above methods (1) to (4), and (6) a method for producing an information recording medium, which comprises preparing a substrate blank according to any one of the above methods (1) to (4), cutting and polishing said substrate blank to produce a substrate for an information recording medium, and forming an information recording layer on the substrate.

PREFERRED EMBODIMENT OF THE INVENTION

Figure 1:
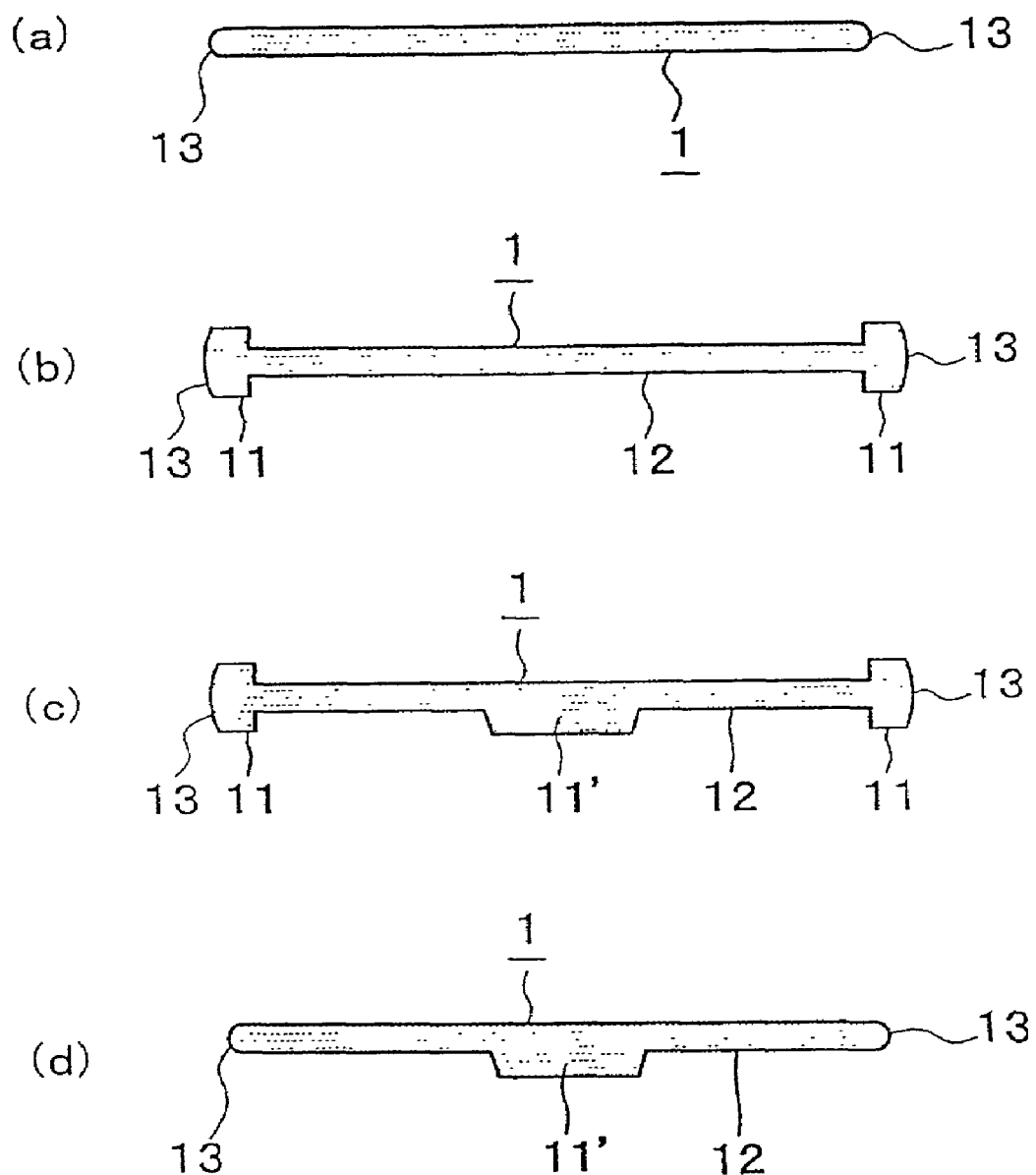
FIGS. 1(a), 1(b), 1(c) and 1(d) are schematic cross-sectional views of disk-shaped substrate blanks having different forms, taken at right angles with two main surfaces.

In the method for the production of a substrate blank (to be sometimes simply abbreviated as "blank" hereinafter), provided by the present invention, the blank is produced by press-molding a glass in a softened state (to be sometimes referred to as "gob" hereinafter) with a mold having an upper mold member and a lower mold member. The two main surfaces of the blank having the form of a thin plate are transfer-molded (formed) with the molding surface of the upper mold member and the molding surface of the lower mold member, respectively. Each of the upper mold member and the lower mold member may be constituted of one or a plurality of members as required.

In the present invention, generally, the gob as a raw material for the blank is supplied into the lower mold member while it is in a molten state, and its weight is controlled such that the blank has a predetermined form. When the gob is supplied into the lower mold member, the temperature of the lower mold member is adjusted for avoiding a case where the gob comes to be non-moldable since the gob is sharply cooled when it comes in contact with the lower mold member. Since, however, the lower mold member generally has a lower temperature than the gob, the heat of the gob and the heat of a glass molded article are absorbed into the lower mold member through a contact surface of the glass and the lower mold member during the casting and press-molding and until a molded glass is taken out of a press mold. During the press-molding, further, while the temperature of the upper mold member is adjusted, the upper mold member has a lower temperature than the gob, so that the heat of the gob and the heat of the glass molded article are also absorbed into the upper mold member during the contacting of the upper mold member to the molded article.

It is considered that the undulation of the molded article takes place due to a large heat radiation distribution that is formed in a surface perpendicular to the pressing direction of the upper and lower mold members in the process in which the molded article having the form of a thin plate is cooled.

In the direct press method, heat radiation distributions are formed in the interior of a molded article and the surface of the molded article, in the central portion and the circumferential portion of the molded article and in a large-thickness portion and a small-thickness portion. It is considered that the following factors make these heat radiation distributions further greater.

(1) When the gob is pressed with the upper and lower mold members, it spreads in a space between the upper and lower mold members, and its circumferential portion comes in contact with a sleeve member, or the like. In this case, the heat radiation from the surrounding edge portion increases, and the temperature of circumference of the glass sharply decreases, so that a heat radiation distribution grows.

(2) The notch described in the foregoing Publication introduced as prior art is a groove having a very small area as compared with main surfaces of a molded article. Such a groove portion has a large contact area to a mold per unit area perpendicular to the pressing direction, and as compared with a circumference of the notch, the heat radiation from the glass comes to be large, which causes the heat radiation distribution to increase in size.

Further, when a notch is formed in the vicinity of the surrounding edge portion by press molding, the heat radiation from the surrounding edge portion also comes to be large due to a contact of a mold to a notch-forming portion, which brings a result similar to (1).

(3) The above notch is used during inner-diameter or outer-diameter processing, and advantageously, the thickness of the notch portion is presumably smaller than the thickness of a substrate as an end product for carrying out the above processing, although the above Publication does not describe so. On the other hand, when the inner-diameter processing is carried out, naturally, the thickness of the intermediate in the above Publication is greater than the thickness of an intended substrate. When the thickness of the notch portion is smaller than the maximum value of thickness of a substrate as an end product as described above, the heat conductivity from the intermediate or an inner hole to the notch portion is lower than the rate of heat radiation from the notch portion to a mold, so that the above heat radiation distribution comes to be far larger.

(4) When the blank has a large-thickness portion and a small-thickness portion whose thickness is the smallest, and if the small-thickness portion has a smaller area than the large-thickness portion, the small-thickness portion comes to be a portion of a local temperature decrease like the above notch, and the heat radiation distribution further increases in size.

(5) With a decrease in the thickness of the blank, the above heat radiation distribution increases in size due to the above factors (1) to (4), and the influence of an undulation caused by the heat radiation distribution increases.

For removing the above factors, the method for the production of a blank, provided by the present invention, comprises press-molding a gob without causing the surrounding edge portion of the blank to come in contact with a mold, to produce the blank at least having no notch portion. The production method of the present invention includes, as preferred embodiments, methods for the production of the following three types of blanks.

The first embodiment is a method for the production of a blank having flat front and reverse surfaces and a surrounding edge portion. The "flat surface" means a surface free of any microscopic valleys and hills formed to attain some purpose except for fine distortion or inevitably occurring fine valleys and hills. In this case, preferably, the front and reverse surfaces, i.e., the main two surfaces of the blank are in parallel with each other.

The second embodiment is a method of the production of a blank having a thickness whose minimum value, i.e., the thickness of the smallest-thickness portion of the blank, is larger than the thickness of the largest-thickness portion of a glass substrate as an end product (maximum value of the thickness of the substrate). The above molding includes the molding of a blank having a large-thickness portion and a small-thickness portion like a blank suitable for producing a plate-shaped glass having excellent flatness, disclosed in JP-A-10-194760 that is a publication of Japanese patent application filed by the present assignee.

Further, the third embodiment is a method for the production of a blank having a large-thickness portion and a small-thickness portion whose thickness is the smallest, the small-thickness portion having a larger area than the large-thickness portion. The above molding includes the molding of a blank suitable for producing a plate-shaped glass having excellent flatness, disclosed in the above JP-A-10-194760.

According to any one of the above first to third embodiments, a blank free from the occurrence of an undulation can be produced. Further, a suitable blank can be also produced by a combination of the above second and third embodiments.

When the surrounding edge portion of a blank that is being produced is not brought into contact with a mold during its press-molding, that is, when the above surrounding edge portion is not defined, the surrounding edge portion forms a free surface. The free surface is a surface to which nothing from the molding surface of the mold is transferred, so that no processing mark existing in the molding surface is transferred. Further, when a powdery mold release agent is applied to the molding surface to carry out the molding, the free surface is a surface that is not pressed with the molding surface to which the power is applied, so that the free surface is free of roughening caused by the mold release agent.

Further, the surrounding edge portion can maintain a relatively low viscosity in the press-molding process as compared with a conventional case, and the surrounding edge portion can undergo plastic deformation when a sink mark occurs in the molded article. In contrast, the surface formed by transfer-molding with the molding surfaces of the upper and lower mold members comes to have a high viscosity as its cooling proceeds, so that a sink mark can be dispersed to the surrounding edge portion, whereby a decrease in the form accuracy of the blank by a sink mark can be decreased.

Even if gob amounts are strictly controlled to be equal one after another, or even if excess glass is merely forced out through a circumference as described in the foregoing Publication, the overall heights corresponding to the maximum thickness of each molded article vary to a greater extent due to a sink mark. In the method of dispersing a sink mark into the surrounding edge portion of each molded article like the present invention, the variability in the overall heights of molded articles (blanks) can be controlled to be within ±5 to 10 μm.

Desirably, the large-thickness portion of the blank is molded in such a manner that the large-thickness portion supports a pressure exerted on the main two surfaces of the blank. For this purpose, preferably, there is employed a constitution in which the large-thickness portion is formed in the circumferential portion of the blank and the small-thickness portion is formed in a portion surrounded by the circumferential portion, a constitution in which the large-thickness portion is formed in the central portion of the blank and the small-thickness portion is formed in a portion surrounding the large-thickness portion, or a constitution in which the large-thickness portions are formed in the circumferential portion and the central portion of the blank and the small-thickness portion is formed between the circumferential portion and the central portion. And, it is preferred to form the large-thickness portion and the small-thickness portion having a uniform thickness each.

The blank preferably has a form that is symmetrical with regard to the pressing direction, like the form of a magnetic disk, that is, the form of a disk. In a disk-shaped blank, a side surface of the disk constitutes the surrounding edge portion.

The present invention is suitable for producing a blank having a thickness of 0.8 to 2.2 mm. Further, when the blank has the large-thickness portion and the small-thickness portion, the present invention is suitable for producing the blank when both the maximum value and the minimum value of the thickness of the blank are in the above range.

FIGS. 1(a) to 1(d) are schematic cross-sectional views of disk-shaped blanks having different forms, taken at right angles with two main surfaces, in which numerals 1 indicate the blanks.

FIG. 1(a) shows a disk-shaped blank 1 having a uniform thickness but having neither a large-thickness portion nor a small-thickness portion. The thickness of the blank is preferably 0.9 to 1.6 mm, particularly preferably 1.0 to 1.5 mm. Further, the blank preferably has the above thickness and an outer diameter of 60 to 100 mm. FIG. 1(b) shows a blank 1 having a large-thickness portion 11 in a circumferential portion of the blank 1 and a small-thickness portion 12 in a portion surrounded by the circumferential portion. FIG. 1(c) shows a blank 1 having large-thickness portions 11 and 11' in a circumferential portion and a central portion of the blank 1 and having a small-thickness portion 12 between the circumferential portion and the central portion. FIG. 1(d) shows a blank 1 having a large-thickness portion 11' in a central portion of the blank 1 and a small-thickness portion 12 in a circumferential portion of the large-thickness portion 11'. When the disk-shaped blank has the large-thickness portion 11 and/or the large-thickness portion 11' and the small-thickness portion 12, preferably, the thickness of such a large-thickness portion is 1.6 to 2.2 mm, and the thickness of the small-thickness portion is 1.4 to 2.0 mm. Further, the blank preferably has a thickness in the above range and an outer diameter of 60 to 100 mm. Numerals 13 indicate circumferential edge portions.

When the press-molding is carried out according to the method for the production of a blank, provided by the present invention, the gob is easily spread, and it is no longer necessary to increase the pressing pressure to excess for forming a molded article having a smaller thickness. As a result, the defect of the press is decreased, and the powdery mold release agent is no longer necessary, so that the surface roughening of a molded article by the mold release agent is decreased. Further, since an extreme increase in the pressing pressure is not required, and since a local small-thickness portion such as a notch is not formed, damaging of a notch-forming portion of a molded article can be prevented.

The method for the production of a blank, provided by the present invention, is particularly suitable for producing a blank for an information recording medium.

The structure of the mold will be explained below.

Figure 2:
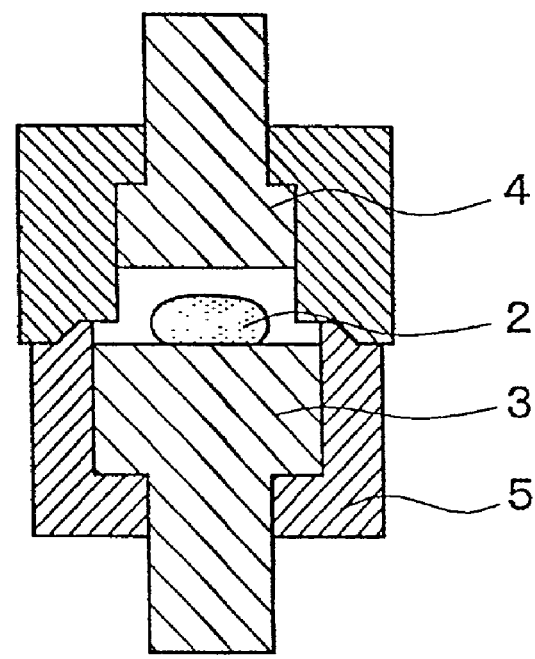
FIGS. 2(a) and 2(b) are schematic drawings for showing one example of the production of a disk-shaped substrate blank by press molding.
Figure 2:
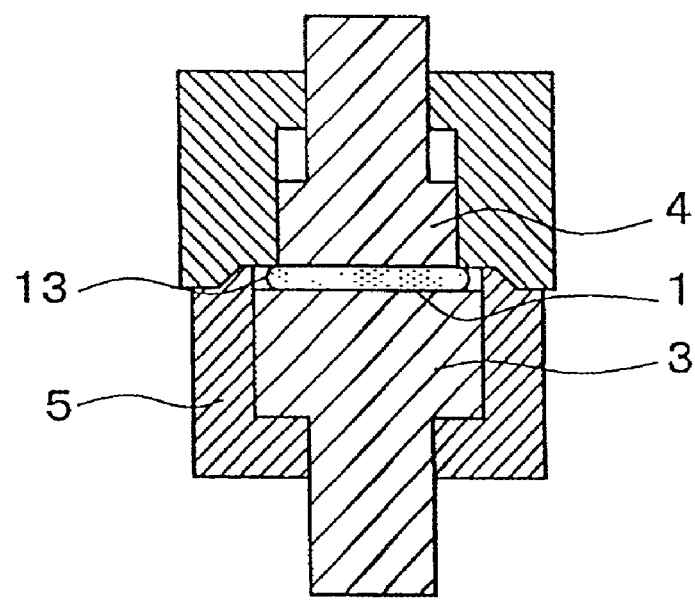

FIGS. 2(*a*) and 2(*b*) are schematic drawings for showing one example of the production of the disk-shaped blank shown in FIG. 1(*a*) by press molding. A mold is formed of a lower mold member 3, an upper mold member 4, a sleeve 5 and an upper sleeve. The upper mold member 4 is slidable inside the upper sleeve. FIG. 2(*a*) shows a state where a gob 2 is supplied onto a molding surface of the lower mold member 3, the upper mold member 4 and the upper sleeve are lowered for pressing, and the sleeve 5 and the upper sleeve are in contact with each other. In the above state, the upper mold member 4 further moves downward and presses the gob 2 together with the lower mold member 3. The gob 2 pressed with the lower mold member 3, the upper mold member 4, the sleeve 5 and the upper sleeve is spread in a cavity to be molded into a press-molded article 1 (FIG. 2(*b*)). In this case, the downward movement of the upper mold member 4 is controlled so that no level difference is made between the molding surface of the upper mold member 4 and a surface to be formed with the upper sleeve. The upper surface of the molded article 1 is therefore formed to be flat, and the lower surface of the molded article 1 is also formed to be flat. The molded article 1 has a surrounding edge portion 13 that does not come into contact with the sleeve 5 (that is not defined by the sleeve 5), so that the surrounding edge portion 13 remains in the molded article 1 to form a free surface. After the press-molding, the molded article 1 is released from the upper mold member 4 and the upper sleeve and left on the lower mold member 3.

The blanks shown in FIGS. 1(*b*) 1(*c*) and 1(*d*) are produced nearly in the same manner as above except that the form of each of transfer-molding surfaces of the mold is altered so as to meet with the from of each blank, and the blanks having surrounding edge portions 13 formed of a free surface each can be obtained.

The production of a blank with the above mold will be explained below.

The material for the substrate for an information recording medium is selected, for example, from a chemically strengthenable glass containing an alkali metal oxide, a high-Young's modulus-glass which suffers little flexure during high-speed rotation, a glass which can have a higher Young's modulus by crystallization and can have a flat and smooth crystallized-glass substrate surface by cutting and polishing, or a glass suitable as a substrate that works as a filter itself or a substrate material that forms an optical filter by forming an optical thin film on the surface thereof. The above glasses include an aluminosilicate glass containing an alkali metal oxide, particularly, lithium oxide, an aluminosilicate glass containing lithium oxide and zirconium oxide, and an aluminosilicate glass containing a divalent component such as magnesium oxide.

The blank can be produced by the following method. First, a molten glass made of the above materials that are melted, clarified and homogenized by stirring is continuously discharged from a discharging nozzle at a constant flow rate, and the molten glass flow is periodically cut with a cutting machine called "shear" so that gobs having a constant weight each can be constantly obtained. Each gob prepared by the cutting is received on the lower mold member placed immediately below the discharging nozzle. The molten glass to be discharged through the discharging nozzle has a viscosity of approximately 0.3 to 100 Pa.s, and the lower mold member has a temperature lower than the temperature of each gob. The lower mold member is adjusted under heat to a temperature at which the gob temperature does not sharply decrease so that the gob can be pressed.

After the above casting is finished, the lower mold member on which the gob is placed is moved to a pressing position where the upper mold member stands, and the gob is press-molded with the upper and lower mold members. In this case, the temperatures of the upper and lower mold members, the pressing pressure and the pressing time period are determined as required for attaining conditions where the surrounding edge portion of a molded article under the production does not come into contact with the mold. For example, the temperature of the upper mold member is set at 250° C. to 550° C., the temperature of the lower mold member is set at 350° C. to 650° C., and the temperature of the upper mold member is adjusted to a temperature that is in the above range and is also in the range of from the temperature of the lower mold member to [the temperature of the lower mold member −100° C.]. As a pressing pressure, approximately several GPa can be employed as a standard, although the pressing pressure shall not be limited to such a range and may be adjusted as required.

After the press-molding is completed, the upper surface of the molded article is released from the upper mold member, and the lower mold member with the molded article placed thereon is moved to a position where the molded article is to be taken out. There may be employed a constitution in which the lower mold member is stopped between the pressing position and the take-out position, the upper surface of the molded article on the lower mold member is pressed with a pressing mold to correct the distortion of the molded article, and then the lower mold member with the mold article thereon is moved to the take-out position. The molded article is cooled to a temperature around, or lower than, the glass transition temperature while it is carried to the take-out position. That is because the deformation caused on the molded article by a force exerted on the molded article is prevented when the molded article is taken out. The take-out is carried out by holding the upper surface of the molded article by suction to the upper surface with suction means. The molded article that has been taken out is rapidly cooled in atmosphere and then placed in an annealing furnace to anneal it. The blank whose distortion is removed by the annealing is transferred to a cutting step, an inner-diameter/outer-diameter processing step or a heat treatment step for crystallization.

The thus-produced blank has a parallelism degree and a flatness which are both in the range of 10 μm even when the blank is a disk-shaped blank having a smallest thickness of 2.2 mm or less and an outer diameter of approximately 100 mm. The blank is free from the occurrence of a great undulation in the cooling step. The above parallelism degree and the flatness are maintained even when the minimum thickness of the blank is decreased to approximately 1.2 mm for obtaining a substrate having an outer diameter of 95 mm and a thickness of 1 mm, and the above is also true even when the minimum thickness of the blank is decreased to approximately 1.0 mm for obtaining a substrate having an outer diameter of 65 mm and a thickness of 0.63 mm. It is therefore seen that the method of the present invention is very effective.

When the blank has the form of a disk, the method of the present invention is suitable for producing the blank having a diameter in the range of from 60 mm to 100 mm. When the blank has the form of a polygon such as a square, the method of the present invention is suitable for producing the blank having sides which is 60 to 100 mm long each. The present invention is suitable particularly for producing a disk-shaped blank that is rotationally symmetric with regard to the pressing direction.

The method for the production of a glass substrate will be explained hereinafter with regard to the step of producing a substrate for an information recording medium from the above blank as an example.

After the above blank is processed to have predetermined inner diameter and outer diameter, the blank is cut and polished, whereby the blank comes to have the form of a substrate and comes to have flat and smooth main surfaces to form a substrate. When the substrate is made of a glass containing an alkali metal oxide, the substrate may be chemically strengthened by an ion exchange method in which the substrate is immersed in a molten salt of an alkali metal. Each of the above steps may be followed by a washing step, and the like, as required.

For obtaining a crystallized glass substrate, the blank that is cut and subjected to inner-diameter and outer-diameter processing as required is heat-treated for crystallization to deposit a crystal phase in an amorphous phase, and the thus-treated blank is cut and polished or subjected to inner-diameter and outer-diameter processing, to obtain the substrate. Each of the above steps may be also followed by a washing step, and the like as required.

In any case, the thickness of the blank can be decreased, and the blank having a decreased undulation can be used, so that the cutting and polishing margin can be decreased by approximately 40%, which produces the merits of resource saving, a decrease in a burden on environments, a decrease in cost, a decrease in cutting and polishing time periods, and the like.

An information recording layer, for example, a magnetic recording layer is formed on the main surface of the thus-obtained substrate for an information recording medium, to give a magnetic recording medium. In addition to the magnetic recording medium, a recording layer is similarly formed, whereby a magneto-optical recording medium, an information recording medium such as an optical memory, and the like can be also obtained.

Further, the blank of the present invention can give an optical filter substrate and an optical element having an optical thin film (including a multi-layered film) formed on the substrate, in addition to the above information recording medium.

EXAMPLES

The present invention will be explained more in detail with reference to Examples hereinafter, while the present invention shall not be limited by these Examples.

Examples 1-4

A gob formed of an aluminosilicate glass containing lithium oxide and zirconium oxide was press-molded with a mold shown in FIG. 2, to blanks for a magnetic disk. FIGS. 1(a) to 1(d) show forms of the thus-obtained blanks, and Table 1 shows dimensions of the blanks and dimensions of substrates obtained from these blanks. No damage of a glass caused by the press-molding was found in these blanks.

Comparative Example

A blank having the same outer diameter as that in Examples 1 to 4 and a thickness of 1.2 mm but having none of a large-thickness portion and a small-thickness portion was produced by a conventional molding method in which the surrounding edge portion of the blank under production came in contact with a mold. The blank had a parallelism degree and a flatness of far more than 100 μm each and it was impossible to correct its undulation by cutting and polishing. For obtaining a substrate having a thickness of 1.0 mm by the conventional method, blanks having none of a large-thickness portion and a small-thickness portion were required to have a thickness of 1.8 mm to 2.0 mm or greater. Table 1 shows the results.

TABLE 1

|  | Example 1 | Example 2 | Example 3 | Example 4 | Comparative Example |
| --- | --- | --- | --- | --- | --- |
| Outer diameter of blank (mm) | 96 | 96 | 96 | 96 | 96 |
| Position of large-thickness portion | No | Circumferential portion | Central portion | Circumferential portion and central portion | No |
| Position of small-thickness portion | No | Entire area surrounded by large-thickness portion | Entire area surrounding central portion | Between circumferential portion and central portion | No |
| Area of small-thickness portion/area of large-thickness portion | — | 7.3 | 9.2 | 3.6 | — |

TABLE 1-continued

|  | Example 1 | Example 2 | Example 3 | Example 4 | Comparative Example |
|---|---|---|---|---|---|
| Thickness of large-thickness portion (mm) | 1.2 | 2.0 | 1.8 | 1.8-2.0 | 1.2 |
| Thickness of small-thickness portion (mm) | 1.2 | 1.8 | 1.75 | 1.75 | 1.2 |
| Parallelism degree (μm) | <10 | <10 | <10 | <10 | >100 |
| Flatness (μm) | <10 | <10 | <10 | <10 | >100 |
| Thickness of substrate (mm) | 1.0 | 1.0 | 1.0 | 1.0 | — |
| Outer diameter of substrate (mm) | 95 | 95 | 95 | 95 | — |
| Moldability | Excellent | Excellent | Excellent | Excellent | Poor |

As described above, when a substrate having a thickness of 1.0 mm and an outer diameter of 95 mm is produced from a blank having none of a large-thickness portion and a small-thickness portion, the cutting and polishing margin in Examples can be decreased to approximately ¼ of the counterpart in Comparative Example.

Example 5

The blanks produced in Examples 1 to 4 were cut and polished, and the blanks were chemically strengthened as required, to obtain glass substrates for a magnetic disk. A magnetic recording layer was formed on each of the substrates to obtain magnetic disks.

Example 6

A blank was prepared in the same manner as in Examples 1 to 4 except that a zirconium oxide-containing aluminosilicate glass different from aluminosilicate glasses used in Examples 1 to 4 was used. The blanks were crystallized by heat treatment, and cut and polished to give crystallized glass substrates for a magnetic disk. In these crystallized glass substrates, the undulation of the blanks were decreased like the glass substrates in Examples 1 to 4, and the cutting and polishing margin was decreased. A magnetic recording layer was formed on each of the thus-produced crystallized glass substrates, to give magnetic disks.

In Examples 5 and 6, other recording layer may be formed in place of the magnetic recording layer. In this case, a magneto-optical recording medium, an optical memory or other information recording medium can be obtained.

In an optical filter substrate blank and an optical filter substrate, the cutting and polishing margin can be also similarly decreased. An optical multi-layered film or single-layered film is formed on the surface of the cut and polished optical filter substrate, whereby the substrate can be imparted with various functions.

Effect of the Invention

According to the present invention, the undulation of a blank for a substrate can be decreased, and the blank can be further decreased in thickness, so that the cutting and polishing margin required for completing the substrate can be decreased. The present invention therefore serves to save resources, decrease a burden on environments, decrease the cutting and polishing time period and decrease a cost. When blanks for various substrates are produced by the method of the present invention, and further, when information record-ing media are produced from substrates produced by the method of the present invention, the method for the production of a substrate and the method for the production of an information recording medium also produce the above effects.

The invention claimed is:

1. A method for producing a substrate blank that is an intermediate for a flat substrate, which comprises press-molding a glass in a softened state with a mold having an upper mold member and a lower mold member to produce a molded article blank having the form of a thin plate, wherein the glass in a softened state is press-molded without causing any surrounding edge portion of the blank under the production to come into contact with the mold members or parts used in the press molding, releasing the upper surface of the molded article from the upper mold member and mold parts, and then cooling the molded article to produce the substrate blank at least having no notch portion and the surrounding edge portion having a free surface provided that the upper surface of the molded article is released from the upper mold member before the molded article is cooled to a temperature at or lower than the glass transition temperature.

2. A method for producing a substrate blank that is an intermediate for a flat substrate, which comprises press-molding a glass in a softened state with a mold having an upper mold member and a lower mold member to produce a molded article having the form of a thin plate, wherein the glass in a softened state is press-molded without causing any surrounding edge portion of the blank under the production to come into contact with the mold members or parts used in the press molding, releasing the upper surface of the molded article from the upper mold member and mold parts, and then cooling the molded article to produce the substrate blank having flat front and reverse surfaces and a surface formed of the surrounding edge portion and the surrounding edge portion having a free surface, provided that the upper surface of the molded article is released from the upper mold member before the molded article is cooled to a temperature at or lower than the glass transition temperature.

3. A method for producing a substrate blank that is an intermediate for a flat substrate, which comprises press-molding a glass in a softened state with a mold having an upper mold member and a lower mold member to produce a molded article having the form of a thin plate, wherein the glass in a softened state is press-molded without causing any surrounding edge portion of the blank under the production to come into contact with the mold members or parts used in the press molding, releasing the upper surface of the molded article from the upper mold member and mold parts, and then cooling the molded article to produce the substrate blank having a thickness whose minimum value is greater than the maximum value of thickness of a glass substrate to be obtained from said substrate blank and the surrounding edge portion having a free surface, provided that the upper surface of the molded article is released from the upper mold member before the molded article is cooled to a temperature at or lower than the glass transition temperature.

4. A method for producing a substrate blank that is an intermediate for a flat substrate, which comprises press-molding a glass in a softened state with a mold having an upper mold member and a lower mold member to produce a molded article having the form of a thin plate, wherein the glass in a softened state is press-molded without causing any surrounding edge portion of the blank under the production to come into contact with the mold members or parts used in the press molding, releasing the upper surface of the molded article from the upper mold member and mold parts, and then cooling the molded article to produce the substrate blank having a large-thickness portion and a small-thickness portion whose thickness is the smallest, the small-thickness portion having a larger area than the large-thickness portion and the surrounding edge portion having a free surface, provided that the upper surface of the molded article is released from the upper mold member before the molded article is cooled to a temperature at or lower than the glass transition temperature.

5. The method of claim 3, wherein the substrate blank is formed to have one of a structure in which the substrate blank has a small-thickness portion in a central portion and a large-thickness portion in a circumferential portion, a structure in which the substrate has a large-thickness portion in a central portion and a small-thickness portion in a circumferential portion, and a structure in which the blank has a large-thickness portion in each of a central portion and a circumferential portion and a small-thickness portion between the circumferential portion and the central portion.

6. The method of claim 1, wherein a molten glass as the glass in a softened state is supplied onto the lower mold member and press-molded.

7. The method of claim 1, wherein the mold having upper and lower mold members is adjusted to have a lower temperature than the glass in a softened state to press-mold the glass.

8. The method of claim 1, wherein the substrate blank has the form of a disk.

9. The method of claim 1, wherein the substrate blank has a thickness whose minimum value and maximum value are both in the range of from 0.8 mm to 2.2 mm.

10. The method of claim 1, wherein the substrate blank is for use as an intermediate for a substrate for an information recording medium.

11. A method for producing a substrate, which comprises cutting and polishing the substrate blank produced by the method recited in claim 1.

12. The method of claim 11, which further comprises the step of heat treatment for crystallizing the glass.

13. A method for producing an information recording medium, which comprises preparing a substrate blank for an information recording medium according to the method recited in claim 10, cutting and polishing said substrate blank to produce a substrate for an information recording medium, and forming an information recording layer on the substrate.

* * * * *